3,009,917
PROTOVERINE 6,7-DIACETATE 15(l)2′-METHYL-BUTYRATE AND ITS PREPARATION
S. Morris Kupchan, Madison, Wis., assignor to Wisconsin Alumni Research Foundation, Madison, Wis., a corporation of Wisconsin
No Drawing. Filed Dec. 7, 1959, Ser. No. 857,498
2 Claims. (Cl. 260—287)

The present invention relates to protoverine 6,7-diacetate 15 (1) 2′-methylbutyrate, herein designated as desatrine, and the method of preparing the same.

Protoveratrine A and B are closely related ester alkaloids isolated from *Veratrum album*. Nash, H. A., et al., J. Am. Chem. Soc., 75, 1942 (1553). The structure of protoveratrine A has recently been disclosed by Kupchan, S. Morris, et al. in J. Am. Chem. Soc., 81, 1009 (1959). Alkaline hydrolysis of protoveratrine A has afforded the known alkamine protoverine. The structure of protoveratrine B has also recently been ascertained to be similar to that of protoveratrine A except for the substituent at the 3-position. J. Am. Chem. Soc., Kupchan, S. Morris, et al. (in press February 1960). I have now discovered that protoveratrine B can be readily converted to desatrine by periodate oxidation followed by alkaline hydrolysis as described below.

EXAMPLE

*Protoverine 6,7-diacetate 15-(1)-2′-methylbutyrate*

A solution of protroveratrine B (1 g.) in 5% acetic acid (20 ml.) was treated with a solution of periodic acid, $H_5IO_6$ (1 g.), in a mixture of water (10 ml.) and t-butanol (60 ml.). The solution was allowed to stand at room temperature for 1 hour, the excess of the oxidizing agent was destroyed by the rapid addition of 0.1 N aqueous sodium arsenite (120 ml.) and the reaction mixture was allowed to stand at room temperature for 10 minutes. The solution was extracted with chloroform, the chloroform extract dried over anhydrous sodium sulfate and evaporated to yield the desired product as a colorless resin. The resin was crystallized from acetone-petroleum ether as needles, M.P. 232–233° C.

Desatrine is characterized by insecticidal properties and can be applied in this field in standard diluents or carriers including dusts and liquids such as kerosene. It has been found effective (LD/50) against ordinary house flies in dilutions as low as 2 mg. desatrine per liter of diluent. For most purposes, concentrations of around .01–1.0% by weight are generally recommended.

Desatrine can be converted into protoverine 3-angelate 6,7-diacetate 15-(1)-2′-methylbutyrate which has been found by Kupchan, S. Morris, et al., J. Am. Pharm. Assoc. (in press Dec. 1959) to be identical to escholerine, the main hypotensive principle of *Veratrum eschscholzii*. This process involves reacting desatrine with 3-bromoangeloyl chloride followed by the hydrogenolysis of the resulting 3-3′-bromoangelate with palladium on charcoal. See Kupchan et al. (Dec. 1959) supra, and the copending S. Morris Kupchan application, Serial No. 857,499 filed December 7, 1959 and Serial No. 857,484 filed December 7, 1959, now abandoned. The latter application discloses a modified method of preparing the compound of the present invention by periodate oxidation of protoveratrine B, followed by mild alkaline hydrolysis at room temperature.

I claim:
1. Protoverine 6,7-diacetate 15-(1)-2′-methylbutyrate.
2. The process of making the compound protoverine 6,7-diacetate 15-(1)-2′-methylbutyrate, which comprises the periodate oxidation of protoveratrine B, followed by mild alkaline hydrolysis at room temperature.

References Cited in the file of this patent
UNITED STATES PATENTS
2,929,812    Nash  ---------------- Mar. 22, 1960

OTHER REFERENCES
Henry: The Plant Alkaloids, 4th ed., pp. 709–710 and 714 (1949).
Theilheimer: Synthetic Methods, vol. 11, p. 314 (1957).